Patented Oct. 9, 1945

2,386,405

UNITED STATES PATENT OFFICE 2,386,405

PLASTICIZING POLYVINYL CHLORIDE

Edmund R. Meincke, Akron, Ohio, assignor to American Cyanamid Company, New York, N. Y., a corporation of Maine No Drawing. Application November 8, 1943, Serial No. 509,488

8 Claims. (Cl. 260—36)

This invention relates to the plasticizing of polyvinyl chloride and more particularly to the production of rubber-like compositions comprising polyvinyl chloride. It has as its principal object the provision of a new class of plasticizers for polyvinyl chloride.

According to my invention this and other objects may be accomplished by employing as plasticizers for the polyvinyl chloride esterification products of 3,6-endomethylene-Δ-4,5-tetrahydrophthalic acid consisting essentially of a mixed ester of the general formula:

$$R(XY)_n$$

wherein R is a residue of a polyhydric alcohol of the group consisting of alkylene glycols containing 2–4 carbon atoms, polyalkylene glycols containing 4–8 carbon atoms, glycerol, and pentaerythritol, X is the residue of 3,6-endomethylene-Δ-4,5-tetrahydrophthalic acid, Y is an alkyl group containing not more than 8 carbon atoms, and $n$ represents the integers, 2, 3 and 4.

This application is a continuation-in-part of my application Serial No. 417,824, filed November 4, 1941.

For brevity and ease of expression, the 3,6-endomethylene-4,5-tetrahydrophthalic acid will hereinafter be referred to as "the tetrahydrophthalic acid," the context permitting.

In the above formula R may be the residue of ethylene, propylene or butylene glycol or of diethylene, dipropylene or dibutylene glycol or of trimethylene, tetramethylene or triethylene glycol. Where R is the residue of one of the dihydric alcohols, X represents the residue of each of two molecules of the tetrahydrophthalic acid, one carboxyl group of each molecule of the tetrahydrophthalic acid being esterified with one hydroxyl group of the glycol or polyalkylene glycol. Where R is the residue of the trihydric alcohol, glycerol, or of the tetrahydric alcohol, pentaerythritol, X represent the residue of each of 3 or 4 molecules of the tetrahydrophthalic acid respectively, one carboxyl group of each molecule of the tetrahydrophthalic acid being esterified with one hydroxyl group of the glycerol or pentaerythritol respectively.

Illustrative of compounds coming within the above general formula are dibutyl ethylene and dibutyl butylene glycol bis(3,6-endomethylene-Δ-4,5-tetrahydrophthalate), dibutyl diethylene and dibutyl dibutylene bis(3,6-endomethylene-Δ-4,5 - tetrahydrophthalate) tributyl glycerol tris(3,6-endomethylene-Δ-4,5 - tetrahydrophthalate) and tetrabutyl pentaerythritol tetrakis(3,6-endomethylene-Δ-4,5-tetrahydrophthalate).

The mixed ester plasticizers are relatively high boiling point liquids and may be prepared as follows:

Example 1

The dibutyl ester of ethylene glycol bis(3,6-endomethylene-Δ-4,5-tetrahydrophthalic acid) may be prepared by heating a mixture of 5 mols 3,6-endomethylene-Δ-4,5-tetrahydrophthalic acid anhydride with 2.5 mols ethylene glycol at a temperature of about 135° C. for about 15 minutes. About eight mols butyl alcohol is then added, preferably with a small amount of sulfuric acid as an esterification catalyst, and heating is continued for about two or three hours additional. The resulting mixed ester may be purified by distilling off excess alcohol under vacuum and then washing wtih dilute alkali and water to remove sulfuric acid. If desired, the product may be treated with decolorizing carbon and dilute potassium permanganate. The resultant product is a brownish liquid.

Similarly, other mixed esters may be prepared by substituting other alcohols for the butyl alcohol set forth in Example 1. Likewise, any of the other glycols mentioned may be substituted for the ethylene glycol of Example 1. Other esterification catalysts may be used in place of the sulfuric acid.

In the practice of the invention, the polyvinyl chloride is plasticized by thoroughly mixing it at elevated temperatures with one or more of the tetrahydrophthalic acid esters, a suitable quantity of plasticizer being, for example, about 85–95% of the polyvinyl chloride by volume. The mixing may be done in any suitable manner, one method being to form a simple mixture of the polyvinyl chloride and plasticizer followed by a more efficient blending of this mixture in a heated mixing apparatus. The mixing apparatus may be an open mill or an internal mixer. Where an open mill is employed, the heated rolls are tightly set and the simple mixture added gradually thereto and passed once therethrough. The resulting flake-like product is collected and returned to the tightly-set rolls and milled thereon until a continuous sheet of the mixture is formed. The rolls are then gradually opened to allow the mixture to build up a rolling bank of relatively small diameter and milling continued until the polyvinyl chloride is plasticized to the desired extent.

The invention is further illustrated by the following specific example to which, however, it is not intended that the invention be restricted.

*Example 2*

One hundred volumes of polyvinyl chloride were stirred with 89 volumes of dibutyl ethylene glycol bis(3,6-endomethylene-Δ-4,5-tetrahydrophthalate). This mixture was gradually fed onto a 6" x 12" open mill, the rolls of which were tightly set and heated to 115° C. After having passed the mixture once through the rolls, the resulting flaky product was collected and returned to the tightly set rolls. A continuous sheet of the mixture was formed in a milling time of about ½ minute. The rolls were then gradually opened to allow the mixture to form a rolling bank of about ¼" diameter and a translucent sheet of plasticized polyvinyl chloride was obtained in a total milling time of 4½ minutes.

Samples of the milled and plasticized product were compounded with vulcanizing agents and these samples were vulcanized in the conventional manner. The vulcanized products obtained from the material of Example 2 had a tensile strength of 2,335 lbs. and an elongation of 28–%. Similar samples made utilizing dibutylphthalate as the plasticizer instead of the plasticizer of Example 2, had a tensile strength of 1,715 lbs. and an elongation of 265%. It is obvious that the products of the present invention give plasticized compositions having outstanding physical properties.

The tetrahydrophthalic acid esters may be employed alone as plasticizers for polyvinyl chloride or they may be used along with the like mixed esters of phthalic acid which are described as plasticizers for polyvinyl chloride in my copending application, Ser. No. 417,823 filed November 4, 1941.

The quantity of plasticizer may be varied, and as well, also, the temperature and length of time of mixing. In general, these interrelated factors will be governed by the efficiency of the plasticizer selected. The efficiency of the plasticizers may be increased by raising the mixing temperature. The mixing time will vary also, of course, with the size of the batch.

The plasticized polyvinyl chloride compositions of the present invention may be used wherever polyvinyl chloride compositions of similar character are now used, such as in the water proofing of fabrics and in the production of calendered, extruded and molded articles. The compositions may be colored with pigments or dyes and contain fillers.

The process of the invention extends also to the plasticizing of polyvinyl chloride containing polyvinyl acetate or other polymerized aliphthatic acid vinyl ester whether the latter are in mechanical mixture with the polyvinyl chloride or have been copolymerized therewith.

Suitable modifications and changes may be made in the invention without departing from the spirit and scope thereof, the foregoing description of the invention being intended by way of illustration except as may be defined in the appended claims.

I claim:

1. A composition comprising polyvinyl chloride plasticized with a mixed ester of the general formula $$R(XY)_n$$

wherein R is the esterifying residue of a polyhydroxy alcohol of the group consisting of alkylene glycols containing 2–4 carbon atoms, polyalkylene glycols containing 4–8 carbon atoms, glycerol and pentaerythritol, X is the residue of 3,6 - endomethylene - Δ - 4,5 - tetrahydrophthalic acid, Y is an esterifying alkyl group containing not more than 8 carbon atoms and $n$ is an integer equal to the number of hydroxyl groups in the alcohol of which R is the residue.

2. A composition comprising polyvinyl chloride plasticized with dibutyl ethylene glycol bis(3,6-endomethylene-Δ-4,5-tetrahydrophthalate).

3. A composition comprising polyvinyl chloride plasticized with dibutyl diethylene glycol bis(3,6-endomethylene-Δ-4,5-tetrahydrophthalate).

4. A composition comprising polyvinyl chloride plasticized with tributyl glycerol tris(3,6-endomethylene-Δ-4,5-tetrahydrophthalate).

5. A process which comprises plasticizing polyvinyl chloride by mixing therewith under the application of heat a mixed ester of the general formula $$R(XY)_n$$

wherein R is the esterifying residue of a polyhydric alcohol of the group consisting of alkylene glycols containing 2–4 carbon atoms, polyalkylene glycols containing 4–8 carbon atoms, glycerol and pentaerythritol, X is the residue of 3,6-endomethylene-Δ-4,5-tetrahydrophthalic acid, Y is an esterifying alkyl group containing not more than 8 carbon atoms, and $n$ is an integer equal to the number of hydroxyl groups in the alcohol of which R is the residue.

6. A process which comprises platicizing polyvinyl chloride by mixing therewith under the application of heat dibutyl ethylene glycol bis(3,6-endomethylene-Δ-4,5-tetrahydrophthalate).

7. A process which comprises plasticizing polyvinyl chloride by mixing therewith under the application of heat dibutyl diethylene glycol bis(3,6-endomethylene-Δ-4,5-tetrahydrophthalate).

8. A process which comprises plasticizing polyvinyl chloride by mixing therewith under the application of heat tributyl glycerol tris(3,6-endomethylene-Δ-4,5-tetrahydrophthalate).

EDMUND R. MEINCKE.